(12) United States Patent  (10) Patent No.: US 7,543,833 B2
Lundmark  (45) Date of Patent: Jun. 9, 2009

(54) INDEPENDENT FRONT WHEEL SUSPENSION, VEHICLE EQUIPPED WITH SUCH A FRONT WHEEL SUSPENSION, AND METHOD OF PRODUCING A SPRUNG SUSPENSION

(75) Inventor: Andreas Lundmark, Gotenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/904,964

(22) Filed: Dec. 7, 2004

(65) Prior Publication Data

US 2005/0073124 A1 Apr. 7, 2005

Related U.S. Application Data

(63) Continuation of application No. PCT/SE03/00653, filed on Apr. 30, 2003, now abandoned.

(30) Foreign Application Priority Data

Jun. 7, 2002 (SE) ..................... 0201728

(51) Int. Cl.
*B60G 3/12* (2006.01)
(52) U.S. Cl. .................. 280/124.13; 280/124.128; 280/124.148; 280/124.149; 280/124.153; 280/124.162; 280/124.166; 280/93.51
(58) Field of Classification Search .......... 280/124.125, 280/124.128, 124.13, 124.134, 124.137, 280/124.148, 124.149, 124.152, 124.153, 280/124.162, 124.166, 771, 89.12, 93.51, 280/124.146
See application file for complete search history.

(56) References Cited

U.S. PATENT DOCUMENTS

| | | | | |
|---|---|---|---|---|
| 3,085,817 | A | * | 4/1963 | Krause et al. ............ 280/5.508 |
| 4,033,605 | A | | 7/1977 | Smith et al. |
| 4,491,342 | A | * | 1/1985 | Aubry .................... 280/124.13 |
| 5,005,859 | A | * | 4/1991 | Satoh et al. ............ 280/124.13 |
| 5,029,885 | A | * | 7/1991 | Steiner ................ 280/124.116 |
| 6,152,467 | A | | 11/2000 | Alesso et al. |
| 6,428,026 | B1 | * | 8/2002 | Smith .................. 280/124.125 |
| 6,779,806 | B1 | * | 8/2004 | Breitbach et al. ..... 280/124.106 |
| 2002/0117829 | A1 | | 8/2002 | Platner |

FOREIGN PATENT DOCUMENTS

| | | |
|---|---|---|
| DE | 4022613 A1 | 1/1992 |
| DE | 10011033 A1 | 4/2001 |
| EP | 0678405 B1 | 10/1995 |

OTHER PUBLICATIONS

International Search Report dated Jul. 22, 2003 from International Application PCT/SE03/00653.

* cited by examiner

*Primary Examiner*—Eric Culbreth
(74) *Attorney, Agent, or Firm*—Novak Druce + Quigg, LLP (57) ABSTRACT

Method and arrangement for providing a suspension for a wheel on a motor vehicle. The wheel suspension includes a stub axle (36, 37) connected to a stub axle carrier (34, 35), a suspension arm (18, 19) which connects the stub axle carrier to the vehicle, and a stabilizer bar (9) fixed transversely to the longitudinal axis of the vehicle. The suspension arm (18, 19) is fixed against rotation to an outer end (14, 15) of the stabilizer bar and rotatably attached in at least one position (22, 23) axially separated from the outer end of the stabilizer bar. The invention also relates to a vehicle provided with such an arrangement.

25 Claims, 6 Drawing Sheets

INDEPENDENT FRONT WHEEL SUSPENSION, VEHICLE EQUIPPED WITH SUCH A FRONT WHEEL SUSPENSION, AND METHOD OF PRODUCING A SPRUNG SUSPENSION

CROSS-REFERENCE TO RELATED APPLICATIONS

The present application is a continuation patent application of International Application No. PCT/SE03/00653 filed 30 Apr. 2003 which was published in English pursuant to Article 21(2) of the Patent Cooperation Treaty, and which claims priority to Swedish Application No. 0201728-3 filed 7 Jun. 2002. Said applications are expressly incorporated herein by reference in their entireties.

TECHNICAL FIELD

The invention relates to a wheel suspension for vehicles, in particular a steered independent front wheel suspension for heavy vehicles.

BACKGROUND OF THE INVENTION

Independent wheel suspensions, in particular front wheel suspensions, for vehicles built on a frame and that include a pair of longitudinal members of U- or I-shaped profile are most commonly of the McPherson-type, or comprise double suspension arms. Such solutions are usually difficult to fit because of the limited space available for their installation. This presents particular problems in the case of front wheel suspensions in which the space is severely limited by the location of the engine between the longitudinal frames. An alternative is to shift the engine, which is often the case in buses, so that the engine is located at the back of the vehicle.

Examples of various types of known independent wheel suspensions are disclosed in DE 2918605, DE 4412145, DE 19515565 and U.S. Pat. No. 4,033,605.

A further problem with current wheel suspensions is that they limit the possible ground clearance and the scope for locating the engine. It is desirable to have the facility for relatively free adjustment of the height of the chassis above ground level, while the engine needs to be located as low down as possible in order to achieve a low center of gravity and a level floor in the driver's cab. These requirements are difficult to achieve with current solutions that have sprung, rigid axles that extend under the frame and the engine.

A wheel suspension which to some extent solves the aforementioned problems is disclosed by SE 9903731 in which each wheel suspension is fixed in a sub-frame fitted around a pair of longitudinal members. The disadvantages with this solution are that it becomes complicated due to all the additional links needed to absorb longitudinal forces and to transmit steering movements, and that the sub-frame takes up a lot of space.

In addition, DE 4021096 demonstrates a relatively compact wheel suspension which affords good ground clearance, but this solution cannot be applied to steered front wheel suspensions and cannot absorb larger lateral forces.

SUMMARY OF THE INVENTION

An object of the present invention is to provide a compact wheel suspension that can absorb lateral forces of the vehicle while at the same time permitting a relatively large vertical adjustment of the wheel. According to the invention, this object is achieved by an arrangement for independent suspension of a wheel on a motor vehicle, especially front wheel suspensions for steered wheels. The invention is also applicable to double front axles and so-called pusher axles. The wheel suspension comprises (includes, but is not necessarily limited to) a stub axle connected to a stub axle carrier, a suspension arm which connects the stub axle carrier to the vehicle, and a stabilizer bar fitted transversely to the longitudinal axis of the vehicle. According to a preferred embodiment, the suspension arm is fixed against rotation relative to an outer end of the stabilizer bar and rotatably attached in at least one position axially separated from the outer end of the stabilizer bar. This embodiment counteracts the vertical sprung movement of the wheel.

In order to be able to damp vertical movements of the wheel, the suspension arm is provided with at least one sprung suspension device at a point in the longitudinal direction of the vehicle separated from the axis of the stabilizer bar. The sprung suspension device preferably has a facility for vertical adjustment.

The sprung suspension device preferably comprises at least one air suspension bellows located between the suspension arm and the underside of the vehicle. The underside consists either of a chassis or a frame on which the vehicle is built. The air suspension bellows are preferably pneumatic so that the ground clearance of the vehicle can be adjusted by controlling the pressurization of the bellows. In addition, the sprung suspension device may also comprise a telescopic damper of pneumatic or hydraulic type, located between the suspension arm and an attachment point on the vehicle.

The example above is primarily intended for heavier vehicles such as heavy trucks that are built on a frame having longitudinal members. For lighter trucks and various types of passenger cars, the air suspension bellows may be replaced by some other type of sprung suspension device such as a coil spring. It is obviously also possible to replace the combined spring and telescopic damper arrangement with a single, more complex type of damper such as a gas-filled shock absorber or a controllable active damper.

The suspension arm preferably has an essentially Y-shaped section. In this case, the suspension arm is fixed to the sprung suspension device in a position along the column of the Y-shaped section, and fixed to the stabilizer bar at both ends of the branches of the Y-shaped section. The stub axle carrier is suitably fixed to a projection that extends outwards and largely parallel to the stabilizer bar. In order to obtain maximum spring travel, the projection is suitably located at the end of the column of the Y-shaped section. This arrangement also applies to the location of the above-mentioned air suspension bellows.

The stabilizer bar is rotatably attached to the underside of the vehicle adjacent to the outer ends thereof, inside the attachment point of each of the suspension arms. In order to prevent flexure of the stabilizer bar when the suspension arms are subjected to lateral forces, a central section of the stabilizer bar may be rotatably attached to the underside of the vehicle at at least one attachment point. For an optimum distribution of the lateral forces imposed, the suspension arm may be rotatably attached to the stabilizer bar on either side of the attachment point. This embodiment also permits the absorption of large forces in the longitudinal direction of the vehicle, for example when braking.

The stabilizer bar may have a number of different shapes and cross-sections, but preferably takes the form of a tubular section having a varying cross-section along its longitudinal axis. The cross-section varies depending on where the attachment points are located along the stabilizer bar in relation to the vehicle and the suspension arms. According to one example, the diameter of the cross-section is greatest in the end sections, thereafter diminishing to a smaller diameter along a central section.

The attachment between the suspension arm and the outer end of the stabilizer bar preferably consists of a splined connection.

The arrangement according to the invention has a pair of stub axles mounted on stub axle carriers on either side of the vehicle. In order to meet current statutory requirements, the stub axles must be mechanically connected to one another. This means that a steering gear provided with a pitman arm acts on one of the stub axles, the movement being transmitted to the other stub axle on the opposite side of the vehicle via a system of suspension links. According to one embodiment, the system of suspension links comprises a transverse suspension link, which runs centrally through the stabilizer bar. This obviates the need to locate any part of the system beneath the vehicle where it may be exposed to external actions, or to form passages in the longitudinal members, which is complicated and leads to cost increases.

According to an alternative embodiment, the vehicle may be provided with a separate hydraulic steering gear on either side of the vehicle, these being hydraulically connected to one another for simultaneous actuation of each stub axle.

According to a further alternative embodiment, the vehicle may be provided with a pair of independent electrical or hydraulic actuators that are actuated by an electrical control signal.

A major advantage with the embodiments specified above is that they provide a very compact independent wheel suspension, which allows large lateral forces and braking forces to be transmitted, together with a relatively large vertical adjustment of the vehicle's ground clearance.

BRIEF DESCRIPTION OF THE DRAWINGS

The embodiments specified in the description will be described with reference to the appended drawings in which:

FIG. 1b is an exposed perspective view showing the wheel suspension according to FIG. 1a;

MODES FOR CARRYING OUT THE INVENTION

Preferred embodiments will be described with reference to the figures which should be appreciated as being illustrative schematic drawings of examples of the invention, but which are otherwise not limiting to the scope of the invention.

In the drawings, the invention is illustrated in intended applications on a vehicle frame typically taking the form of two longitudinal members of U or I-shaped cross-section, and where the engine is mounted between the members and the front wheels of the vehicle. Unless otherwise stated, in the following text, the design of the independent wheel suspension is described for one side of the vehicle.

Figure 1A:
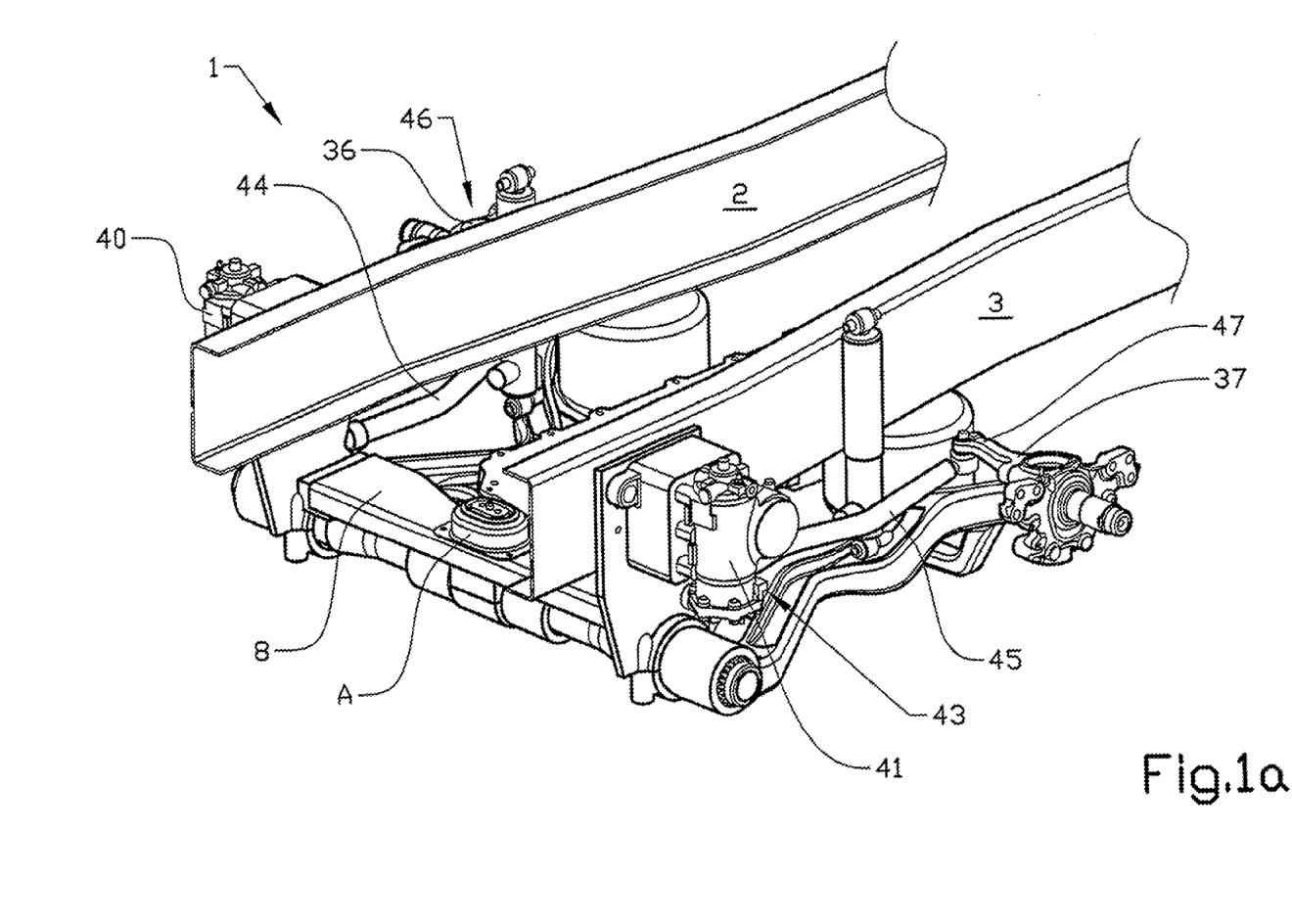
FIG. 1a is a perspective view showing the wheel suspension, viewed obliquely from the front.
Figure 1B:
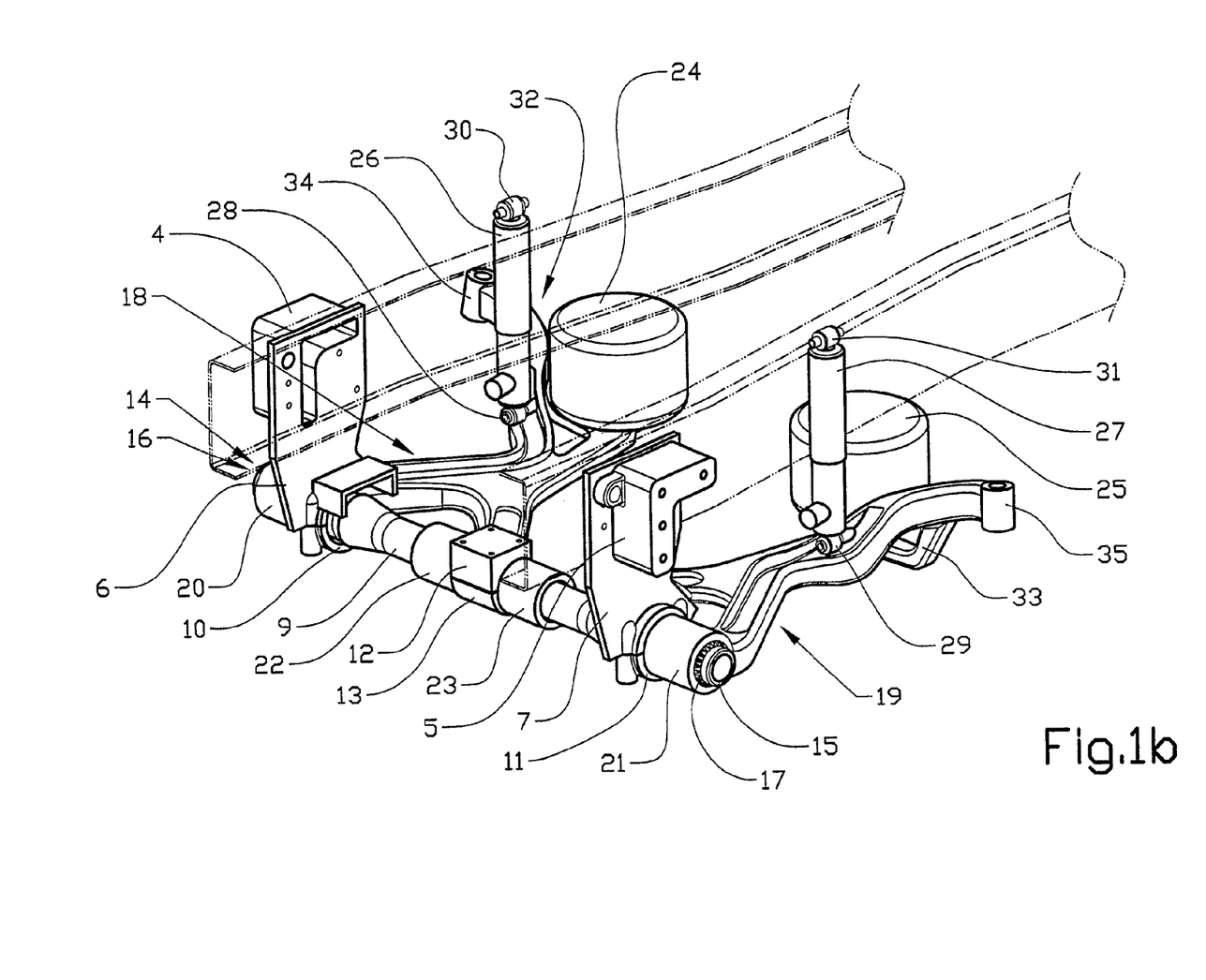

FIGS. 1a and 1b show a front wheel suspension for a vehicle built on a frame 1, which comprises a pair of longitudinal members 2, 3. The members 2, 3 are indicated by dashed lines in FIG. 1b in order to expose the underlying components. On their front parts, the members have a pair of brackets 4, 5, which include respective plates 6, 7 that extend down below the lower surface of the frame members. The plates 6, 7 constitute attachment means for a cross-member 8, which joins the longitudinal members 2, 3. At their lower ends, the plates 6, 7 are provided with holders 10, 11 for a transverse stabilizer bar 9 that can be filled by insertion through the holders 10, 11, and is capable of rotating in relation to these holders. In order to support the stabilizer bar 9 under different loads, especially when the wheel suspension is subjected to a bending moment, the central section of the cross-member 8 is provided with a further central holder 12, 13. This holder 12, 13 is divided into an upper section 12 fixed to the underside of the cross-member 8 and a lower section 13 fixed to the upper section 12. The sections 12, 13 of the holder are bolted together around the stabilizer bar 9 once this has been fitted in its outer holders 10, 11. The holder 12, 13 only constitutes a support for absorbing forces and the stabilizer bar is arranged so that It can rotate between the two sections.

The cross-member 8 is also provided with an engine attachment means A on its upper side. This attachment means is not part of the invention and will not be further described. In FIG. 1b, the cross-member 8 has been omitted in order to expose the underlying components.

The outer ends 14, 15 of the stabilizer bar are provided with outer splines 16, 17 for interaction with corresponding inner surfaces on a suspension arm 18, 19. Each suspension arm 18, 19 is fitted to the stabilizer bar 9 by an outer attachment means 20, 21 and an inner attachment means 22, 23. Here, the outer attachment means 20, 21 is provided with inner splines for a fixed, non-rotational interaction with the stabilizer bar 9, while the inner attachment means 22, 23 is rotatably fitted with rubber bushings around the stabilizer bar 9 on either side of the central holder 12, 13. After fitting, the splined connection is locked in order to prevent relative movement between the suspension arms 18, 19 and the stabilizer bar 9 transversely to the longitudinal axis of the vehicle. In plan view the suspension arm 18, 19 has an essentially Y-shaped section. The outer and the inner attachment means 20, 21 and 22, 23 respectively are located at the ends of the outer branches of the Y-shaped suspension arm. The suspension arm 18, 19 extends rearwards on the longitudinal axis of the vehicle and at its rear end, corresponding to the column of the Y-shaped section, is fixed to a sprung suspension device in the form of an air suspension bellows 24, 25. The air suspension bellows 24, 25 is fixed to the underside of the longitudinal member 2, 3. In order to achieve the longest possible spring travel, the air suspension bellows is located as far back on the suspension arm as the design construction will allow.

A further, second sprung suspension device in the form of a telescopic damper 26, 27 is fitted to the suspension arm 18, 19 slightly in front of the air suspension bellows 24, 25. The lower attachment point 28, 29 of the telescopic damper 26, 27 is located in front of and slightly outside the attachment point of the air suspension bellows, since this runs on the outside of the member 2, 3 between the suspension arm and the upper attachment point 30, 31 on the vehicle (not shown). The telescopic damper is preferably of hydraulic type, but may also be of pneumatic type or may take the form of an active, controllable damper.

From the rear part of the suspension arm, a transverse support arm 32, 33 extends outwards from the member 2, 3, the support arm 32, 33 having a stub axle carrier 34, 35 for a stub axle 36, 37 at its outer end. The stub axle 36, 37 in turn supports a stub axle on which a wheel is fitted. The wheel is steered in that a steering gear 40, 41, mounted on the bracket 4, 5 for the stabilizer bar 9, acts on a pitman arm 42, 43 (see FIG. 3), which in turn acts on a control link 44, 45 connected to a lever arm on the stub axle 36, 37. A steering linkage of this type is generally known, and therefore will not be described in greater detail.

Figure 2:
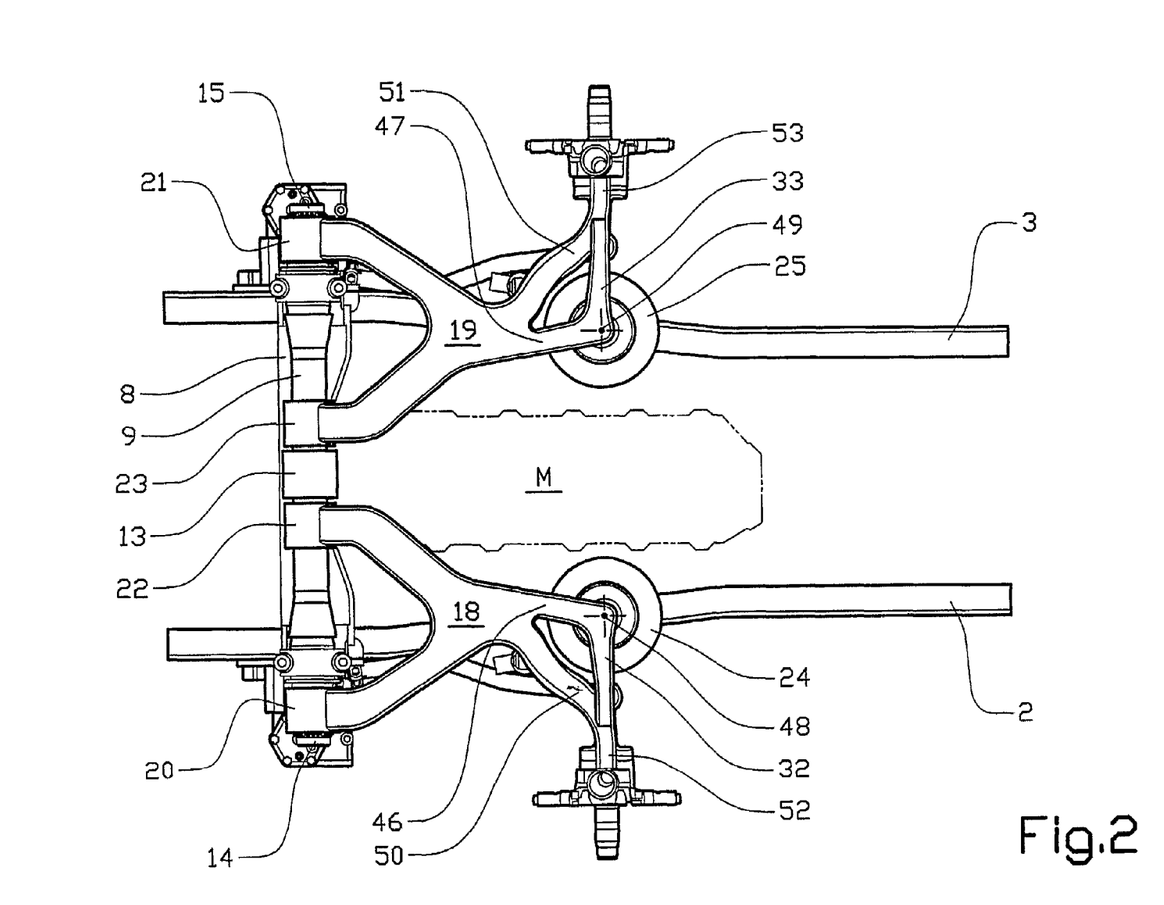
FIG. 2 is a plan view of the wheel suspension, viewed from below.

FIG. 2 shows a plan view of the wheel suspension viewed from below, in which the Y-shaped section of the suspension arm 18, 19 can clearly be seen. Also shown are the attachment means 20, 21 thereof at the outer sections 14, 15 of the transverse stabilizer bar 9. The figure also shows that the inner attachment means 22, 23 of the suspension arm 18, 19 are located close to but not in contact with the central holders 12, 13 for the stabilizer bar 9 at the central section of the stabilizer bar 9. The general location of the engine M between the suspension arms 18, 19 and the sprung suspension devices (24, 25) is indicated by a dashed line.

It is also possible to locate the inner attachment means 22, 23 of the suspension arms 18, 19 up against one another on either side of the vehicle longitudinal axis. In this case, the holder for supporting the central section of the stabilizer bar 9 may be omitted, or it may be designed as two separate holders located on either side of the two inner attachment means.

Each suspension arm 18, 19 has a rear part formed in two sections; a first section 46, 47 extending essentially straight backwards to an attachment point 48, 49 below the air suspension bellows 24, 25, a transverse support arm 32, 33 (see FIG. 1a) being angled essentially straight outwards and upwards in relation to the longitudinal centre axis of the vehicle to terminate in a stub axle carrier 34, 35 for a stub axle 36, 37 at its outer end. The upward angling of the transverse support arm 32, 33 is directly dependent on the wheel diameter and the height of the air suspension bellows in question. A second section 50, 51 departs from the column in the Y-shaped section of the suspension arm before this reaches the outer periphery of the air suspension bellows. This second section 50, 51 is curved rearwards and upwards along the periphery of the air suspension bellows, following which the transverse support arm 32, 33 of the first section and the second section 50, 51 merge into a single support arm 52, 53 in proximity to the stub axle carrier 34, 35 for the stub axle 36, 37.

Other embodiments of the suspension arm are obviously possible. It is possible, for example, to form the rear section of the suspension arm in one piece extending rearwards to the air suspension bellows, before then being angled outwards and upwards. This represents a reinforced version of the first section of the suspension arm shown. The embodiments described above relate to a wheel suspension for steered wheels, for which reason the front, outer section of the suspension arm is angled in towards the side member in order to allow sufficient space for the wheel at full wheel lock.

Figure 3:
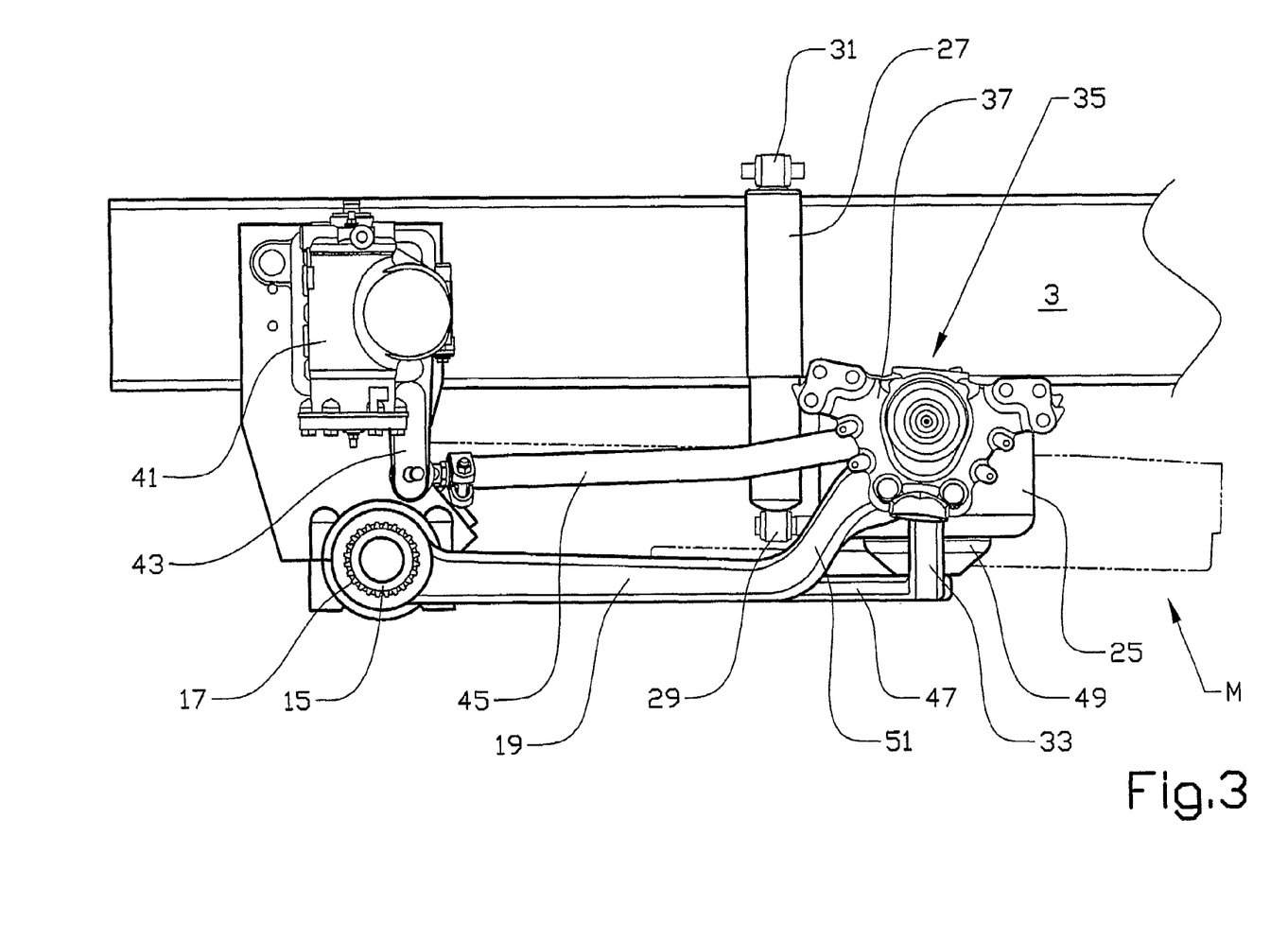
FIG. 3 is a side view of the wheel suspension.

FIG. 3 shows a side view of a wheel suspension according to the invention from which the horizontal location of the suspension arm 18, 19 below the member 2, 3 can be seen. This location of the suspension arm 18, 19 and the transverse stabilizer bar 9 allows the engine M to be mounted low down, which gives the vehicle a low center of gravity. The lower boundary of the engine is indicated by a dashed line.

It will also be seen from the figure that the stabilizer bar may have a varying cross-section along its longitudinal axis. According to the example the stabilizer bar 9 takes the shape of a tube with its greatest diameter at its outer ends 14, 15, before narrowing to its smallest diameter along its central section. In this way the diameter and material thickness of the stabilizer bar 9 can be optimized for different loads and vehicle weights, whilst achieving a saving in the weight of the stabilizer bar. The stabilizer bar may also be manufactured from various materials, such as steel or composite material, for example, depending on the required characteristics.

The attachment point 48, 49 of the suspension arm 18, 19 under the air suspension bellows 24, 25 can also be seen from the figure. By controlling the pressurization of the air suspension bellows 24, 25, it is possible to vary the height above ground level, or ground clearance of the vehicle.

FIG. 3 also shows the design of the splined connection 16, 17 between the suspension arm 18, 19 and the stabilizer bar 9 at the outer end of the stabilizer bar, the lower attachment means 28, 29 of the telescopic damper 26, 27 in the second section 50, 51 of the suspension arm, and how the first and second section of the suspension arm are angled vertically upwards to merge in a support arm in proximity to the stub axle carrier 34, 35. Finally, FIG. 3 shows the steering gear 40, 41 with its pitman arm 42, 43 and its attachment means to the control link 44, 45 which acts on the stub axle 36, 37.

Figure 4:
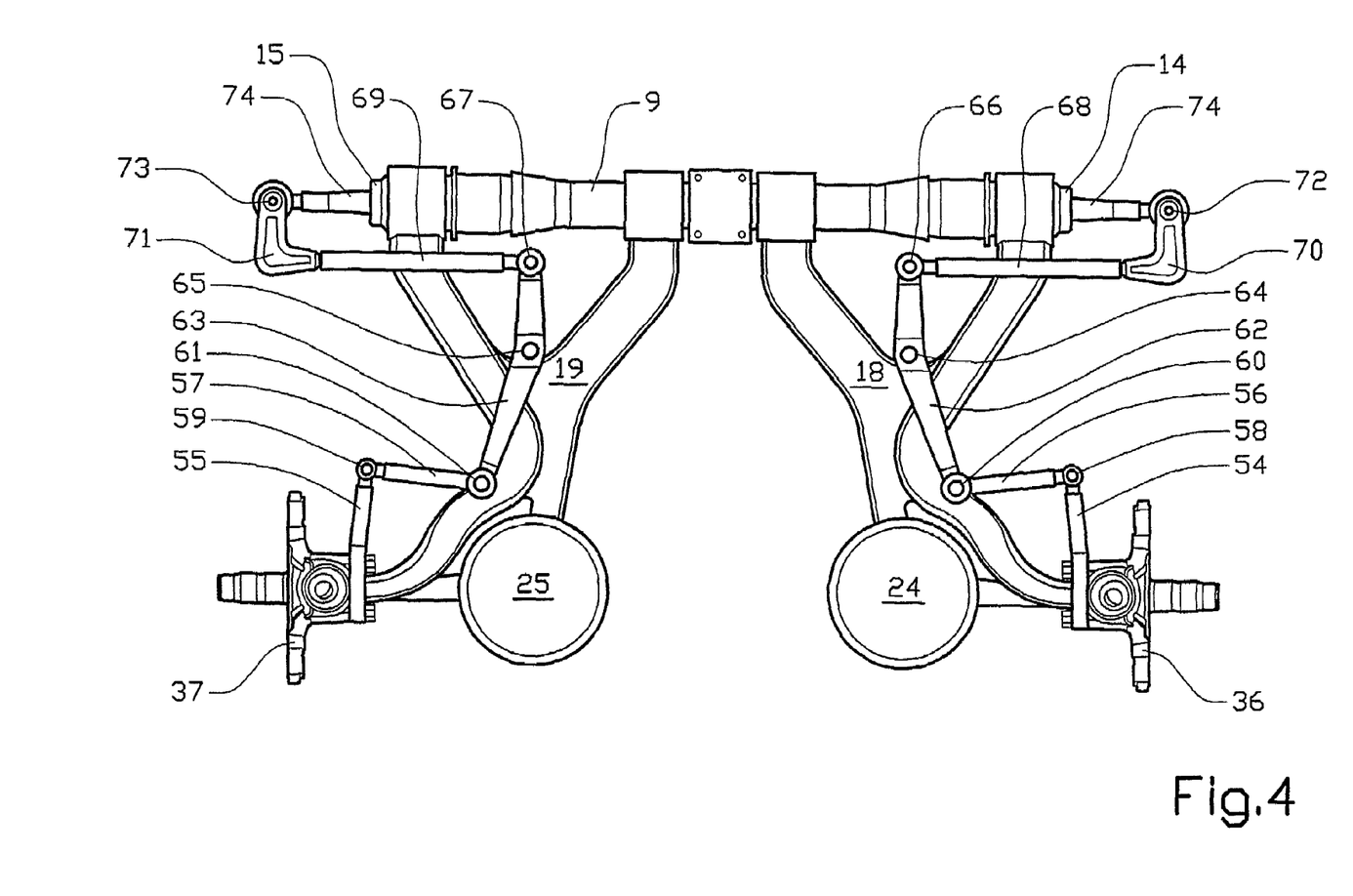
FIG. 4 is a plan view of the wheel suspension with a first embodiment of the steering linkage, viewed from above.

FIG. 4 shows an embodiment of a steering linkage for translating rotational movement of a single steering gear to the stub axles on both sides of the vehicle. The steering gear and its associated mechanism is located on one side of the vehicle in the same way as the steering gear 41 which has been described in connection with FIG. 1a. The steering linkage comprises a plurality of control links, with a first link 54, 55 being rotatably fixed to the stub axle 36, 37 and extending essentially forwards in the longitudinal direction of the vehicle, to a second link 56, 57. The first and the second link are connected at a first pivot point 58, 59. The second link 56, 57 extends inwards from the first pivot point 58, 59 to a second pivot point 60, 61, where it is connected to a lever arm 62, 63. The lever arm is rotatably connected to the suspension arm 18, 19 at a third pivot point 64, 65 and extends essentially in the longitudinal direction of the vehicle from the second pivot point 60, 61 through the third pivot point 64, 65 to a fourth pivot point 66, 67 adjoining the stabilizer bar 9. A third link 68, 69 extends parallel with and behind the stabilizer bar 9, from the fourth pivot point 66, 67 and outwards past the outer end 14, 15 of the stabilizer bar. The outer section of the third link comprises an L-shaped part 70, 71 that extends forwards to a fifth pivot point 72, 73 situated on an extension of a central axis which passes through the stabilizer bar. This fifth pivot point 72,73 is connected to a corresponding pivot point on the opposite side of the stabilizer bar 9 by way of a transverse link 74, which runs through the hollow stabilizer bar 9. Torsion of the stub axle 36, 37 caused by the steering gear on one side of the vehicle is transmitted via the steering linkage described above and the transverse link 74 to a corresponding, laterally inverted steering linkage on the opposite side of the vehicle.

Figure 5:
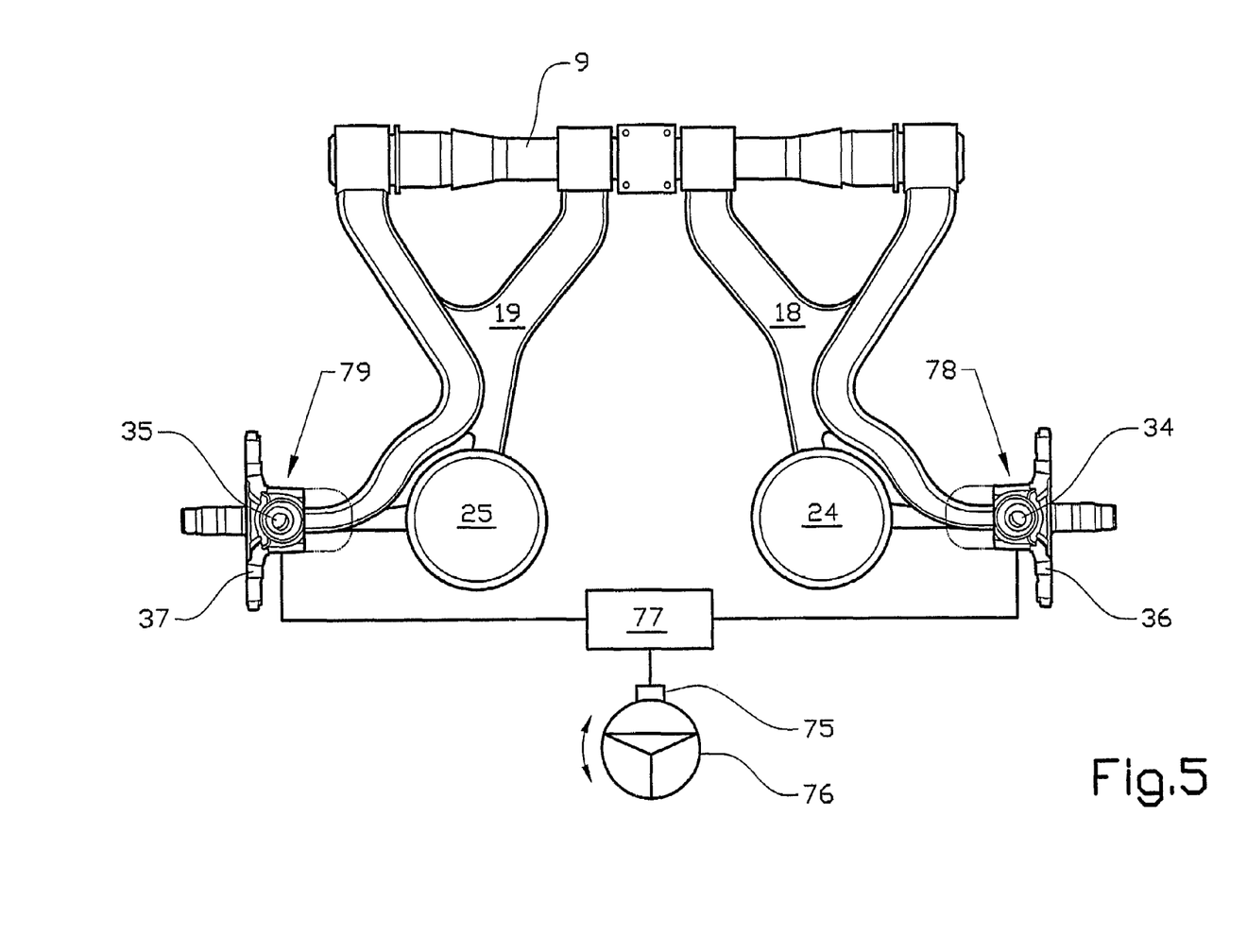
FIG. 5 is a plan view of the wheel suspension with a second embodiment of the steering linkage, viewed from above.

According to an alternative embodiment, which can be seen from FIG. 5, each stub axle carrier 34, 35. and stub axle 36, 37 may be provided with independently controllable drive units 78, 79. A sensor 75 connected to the steering wheel 76 or steering column and which detects the driver's steering movements emits an electrical control signal, which is sent to an electronic control unit 77, which in turn transmits control signals to each drive unit 78, 79. The drive units, which may be electrical or hydraulic, then transmit a turning movement to each wheel corresponding to the steering wheel angle applied by the driver. Such a solution affords scope for programming the electronic control unit, in order to give the steering system the desired characteristics. It is possible, for example, to produce progressive steering, by means of which the same steering wheel angle can give differing wheel angles according to the speed of the vehicle, and to give each wheel a different steering angle.

According to a further alternative embodiment, each stub axle carrier 34, 35 and stub axle 36, 37 may be provided with hydraulically adjustable steering gears. Both steering gears are in this case coupled to a common pressure source, which delivers pressure to the drive units according to input signals from a sensor connected to the steering wheel or steering column. The sensor detects the steering wheel movements of the driver and via an electronic control unit emits an electrical control signal, which controls the pressure to the steering gears. The advantage with this and the preceding embodiment is that it is possible to use two smaller steering gears in place of one significantly larger and heavier steering gear.

What is claimed is:

1. A wheel suspension for a wheel on a motor vehicle, said wheel suspension comprising:
    a first stub axle (36, 37) connected to a stub axle carrier (34, 35);
    a suspension arm (18, 19) that connects the stub axle carrier to the vehicle; and
    a stabilizer bar (9) fixed transversely with respect to a longitudinal axis of the vehicle, the stabilizer bar (9) comprising a tubular section of varying cross-section over its own longitudinal axis;
    said stabilizer bar having an outer end non-rotationally fixed to one portion of said suspension arm and rotationally fixed to said vehicle, and having a central section rotationally coupled to another portion of said suspension arm.

2. The wheel suspension as recited in claim 1, wherein the suspension arm (18, 19) has a substantially Y-shaped section.

3. The wheel suspension as recited in claim 2, wherein the suspension arm (18, 19) is fixed to a sprung suspension device (24, 25; 26, 27) along the column of the Y-shaped section.

4. The wheel suspension as recited in claim 2, wherein the suspension arm (18, 19) is fitted to the stabilizer bar (9) at an end (22, 23) of a branch of the Y-shaped section.

5. The wheel suspension as recited in claim 1, wherein the stabilizer bar (9) is rotatably attached to the underside of the vehicle.

6. The wheel suspension as recited in claim 1, wherein said central section of the stabilizer bar (9) is further rotatably attached to the underside of the vehicle.

7. The wheel suspension as recited in claim 6, wherein the suspension arm (18, 19) is rotatably attached to the stabilizer bar (9) in proximity to a point of attachment of said stabilizer bar to said vehicle.

8. The wheel suspension as recited in claim 1, wherein the suspension arm (18, 19) is fixed to the outer end (14, 15) of the stabilizer bar (9) through a splined connection (16, 17).

9. The wheel suspension as recited in claim 1, further comprising a second stub axle which is mechanically linked by way of a system of control links to said first stub axle.

10. The wheel suspension as recited in claim 9, wherein the system of control links comprises a transverse suspension link (74) which runs centrally through the stabilizer bar (9).

11. The wheel suspension as recited in claim 1, wherein said first stub axle is provided with at least one of independent electrical and hydraulic actuators (78, 79), which are actuated by electrical control signals.

12. The wheel suspension as recited in claim 1, wherein the suspension arm (18, 19) is provided with at least one sprung suspension device (24, 25; 26, 27) at a point separated from the axis of the stabilizer bar (9).

13. The wheel suspension as recited in claim 12, wherein said at least one sprung suspension device (24, 25) is vertically adjustable.

14. The wheel suspension as recited in claim 12, wherein the sprung suspension device comprises an air suspension bellows (24, 25) located between the suspension arm (18, 19) and the underside of the vehicle.

15. The wheel suspension as recited in claim 12, wherein the sprung suspension device comprises a telescopic damper (26, 27) located between the suspension arm (18, 19) and an attachment point on the vehicle.

16. The wheel suspension as recited in claim 1, wherein the wheel suspension is configured to be installed on a vehicle built on a frame comprising longitudinal members (2, 3).

17. A vehicle provided with a wheel suspension comprising a stub axle (36, 37) connected to a stub axle carrier (34, 35), a suspension arm (18, 19) which connects the stub axle carrier to the vehicle, and a stabilizer bar (9) fixed transversely with respect to a longitudinal axis of the vehicle and comprising a tubular section of varying cross-section over its own longitudinal axis, said stabilizer bar having an outer end non-rotationally fixed to one portion of said suspension arm and rotationally fixed to said vehicle and having a central section rotationally coupled to another portion of said suspension arm.

18. The vehicle as recited in claim 17, wherein the suspension arm (18, 19) has an essentially Y-shaped section.

19. The vehicle as recited in claim 18, wherein the suspension arm (18, 19) is fixed to a sprung suspension device (24, 25; 26, 27) along the column of the Y-shaped section.

20. The vehicle as recited in claim 18, wherein the suspension arm (18, 19) is fitted to the stabilizer bar (9) at an end (22, 23) of a branch of the Y-shaped section.

21. The vehicle as recited in claim 17, wherein the stabilizer bar (9) is rotatably attached to the underside of the vehicle.

22. The vehicle as recited in claim 17, further comprising a central section of the stabilizer bar (9) being rotatably attached to the underside of the vehicle at at least one attachment point (12, 13).

23. The vehicle as recited in claim 22, wherein the suspension arm (18, 19) is rotatably attached to the stabilizer bar (9) in proximity to the attachment point (12, 13).

24. A suspension for steerable wheels of a motor vehicle, comprising:
    a pair of stub axles respectively connected to a pair of stub axle carriers, and being connected to a wheel steering mechanism;
    a pair of suspension arms coupling said stub axle carriers to said vehicle; and
    a stabilizer bar having outer ends each non-rotationally fixed to one portion of a respective suspension arm and rotationally fixed to said vehicle, and having a central section rotationally coupled to another portion of each of said suspension arms.

25. The suspension of claim 24, further comprising at least one steering gear mounted to said vehicle proximate an outer end of said stabilizer bar, and a steering control linkage coupling said steering gear to at least one of said stub axles.

* * * * *